Oct. 26, 1948.                    C. H. ZIMMERMAN                         2,452,281
                              AIRCRAFT PROPULSION MEANS
Filed July 6, 1944                                                  3 Sheets-Sheet 1
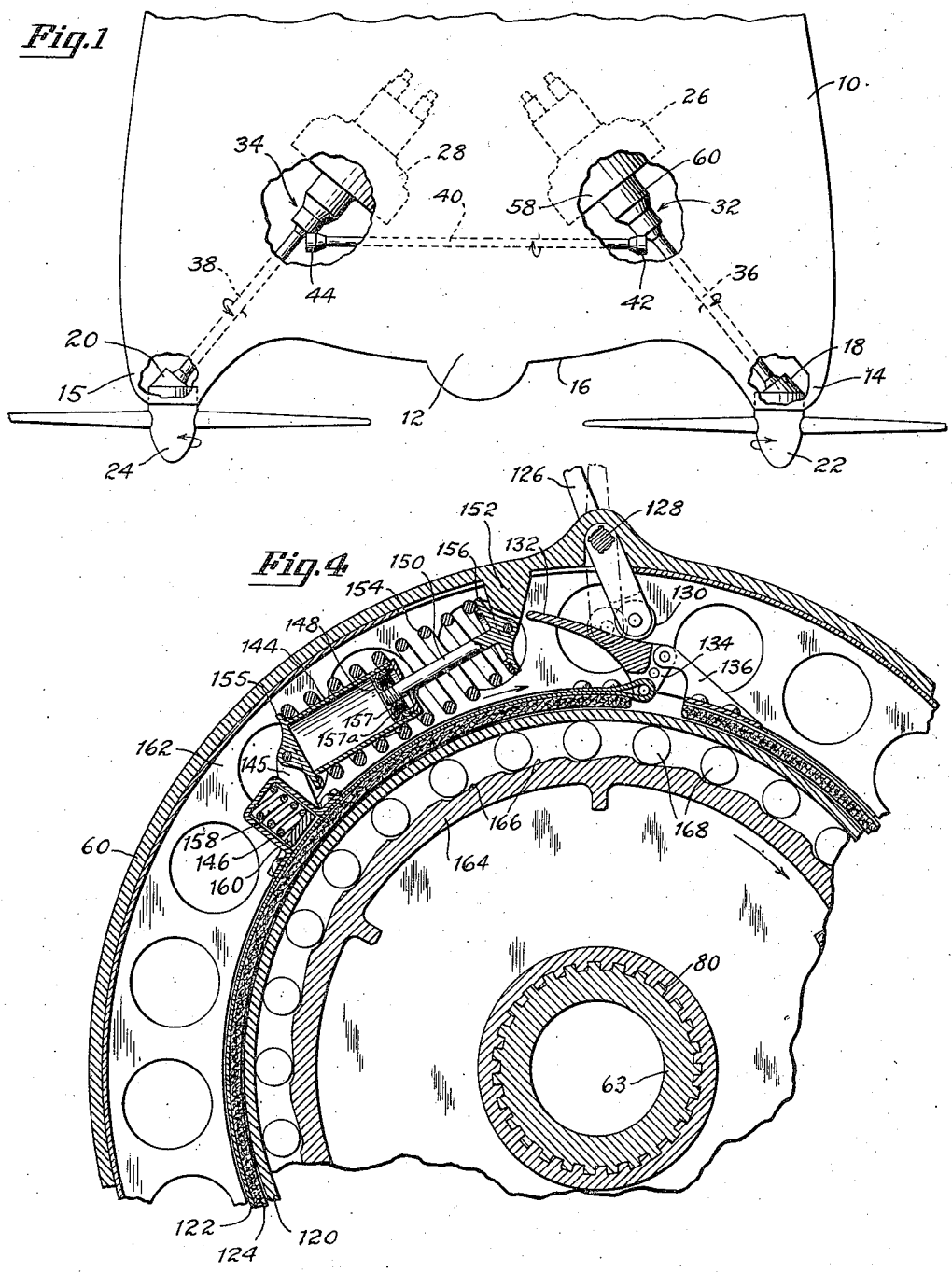
INVENTOR
Charles H. Zimmerman
BY Charles L. Shelton
ATTORNEY.

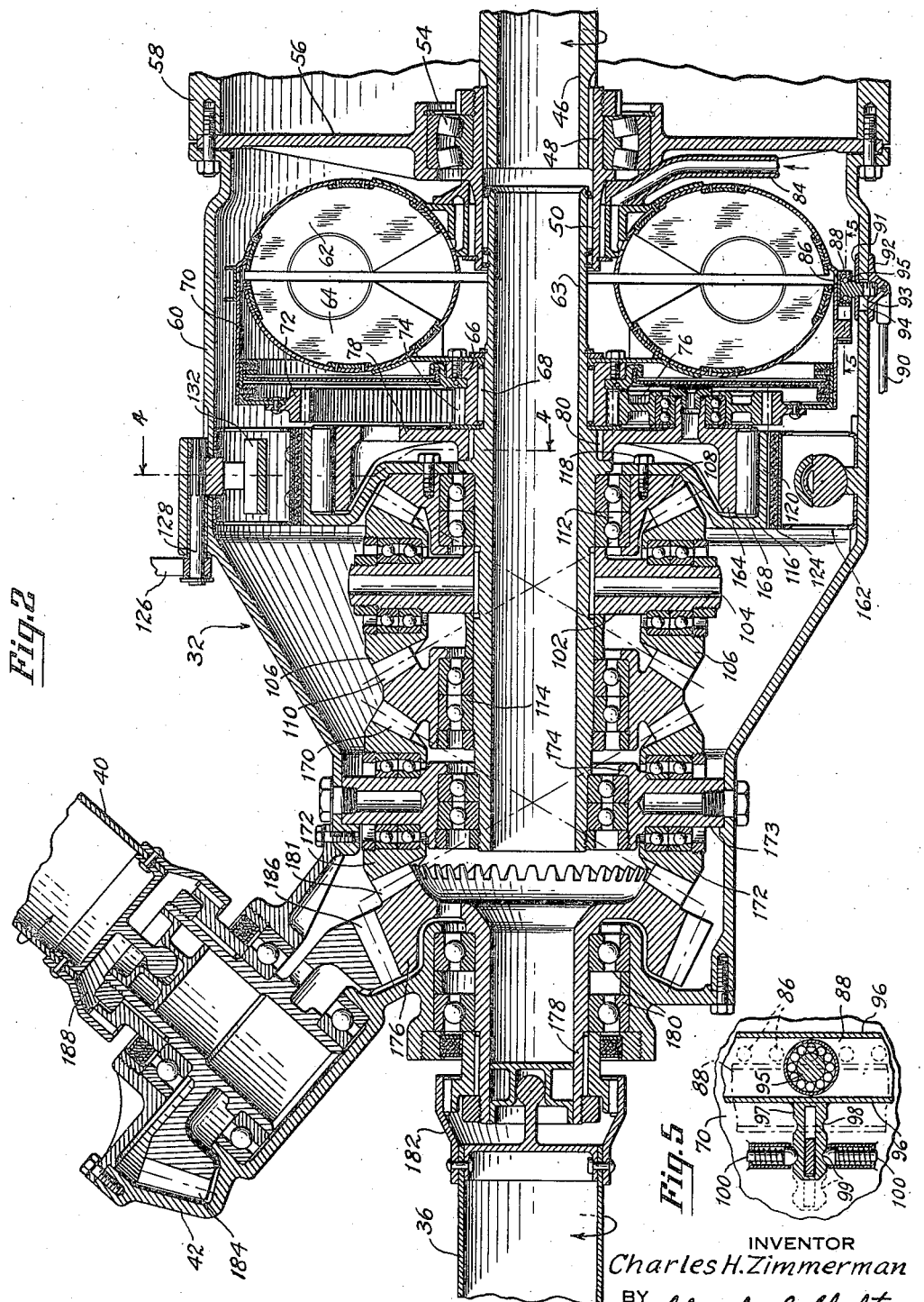

Oct. 26, 1948.  C. H. ZIMMERMAN  2,452,281
AIRCRAFT PROPULSION MEANS
Filed July 6, 1944  3 Sheets-Sheet 3
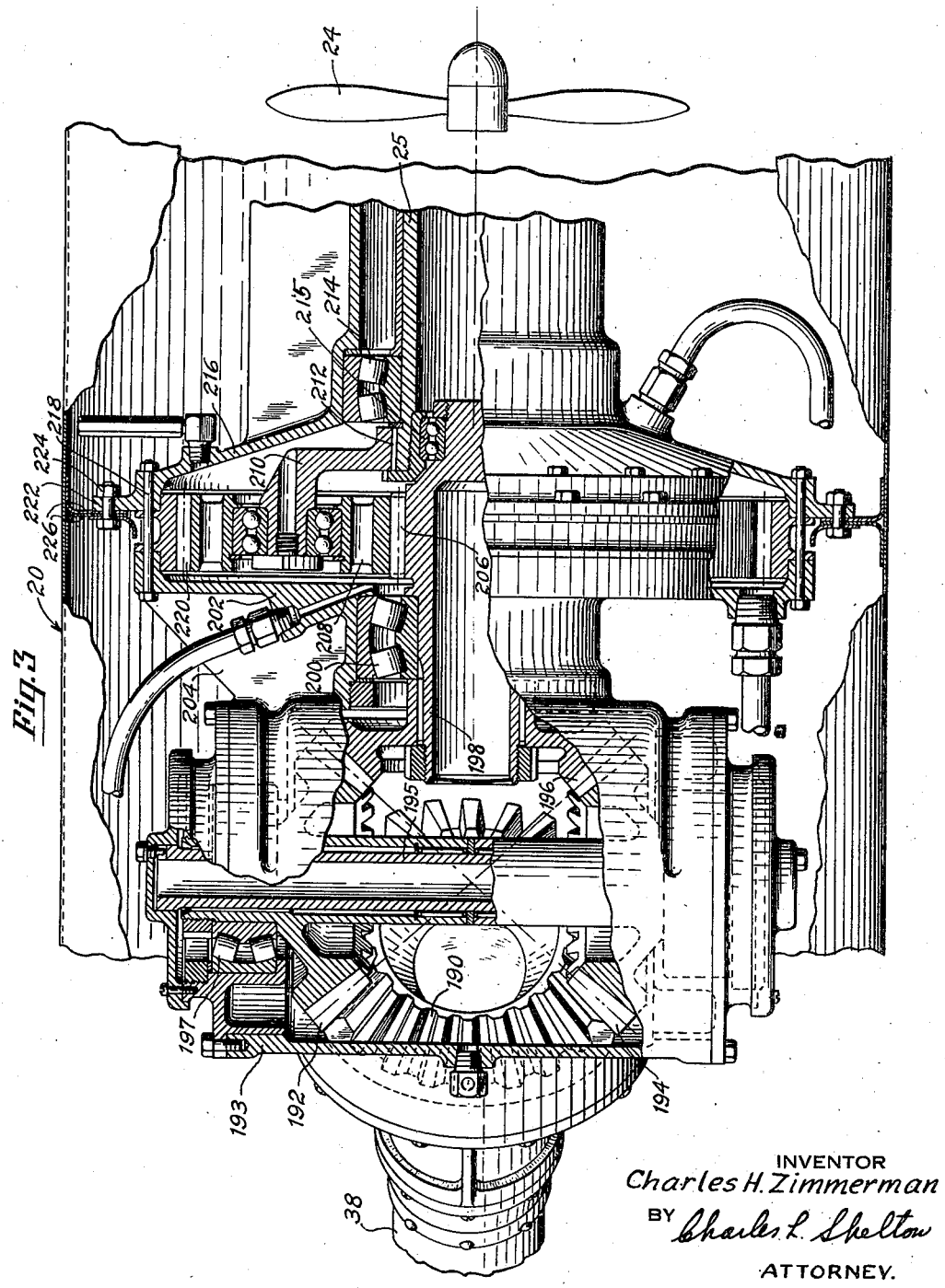
INVENTOR
*Charles H. Zimmerman*
BY *Charles L. Shelton*
ATTORNEY.

Patented Oct. 26, 1948

2,452,281

UNITED STATES PATENT OFFICE 2,452,281

AIRCRAFT PROPULSION MEANS

Charles H. Zimmerman, Nichols, Conn., assignor to United Aircraft Corporation, East Hartford, Conn., a corporation of Delaware Application July 6, 1944, Serial No. 543,632

19 Claims. (Cl. 244—60)

This invention relates to aircraft propulsion and particularly to a propeller drive system for an airplane in which the driving power is supplied by a plurality of engines driving a plurality of interconnected propellers.

One of the objects of the invention is to provide improved means for driving two propellers from two engines, whereby either engine or both can be disconnected from the driving system by the pilot, and whereby either engine is immediately disconnected from the system automatically upon failure of that engine.

Another object of the invention is to provide two interconnected engine-propeller sets wherein the propellers are rotated in opposite directions and at equal speed by like rotating engines.

A further object of the invention is to provide a driving system of this general type having two-speed gearing between each engine and the remainder of the system, and in which change of gear ratio can be made quickly from either one to the other speed without throttling the engines or disconnecting them from the system.

A further object of the invention is to provide an improved multi-engine, multi-propeller driving system for a low aspect ratio, all wing airplane; and more specifically to provide a two-engine drive for two widely spaced propellers at the forward lateral extremities of such an airplane in which the engines are located in the wing on opposite sides of the pilot compartment and the engine drives are directed on opposite sides of the compartment to the propellers.

A still further object of the invention is to provide means for eliminating torsional oscillation in the engine drives.

A still further object of the invention is to provide a two-propeller, two-engine drive system of this general type for a low aspect ratio, all wing airplane in which the engine drives are directed obliquely from the engines on opposite sides of the pilot compartment toward the propellers.

Other objects are to provide an improved interconnected multiple engine-propeller driving system having a minimum of driving shafts and interconnecting gear cases; to provide differential gear mechanism for increasing the number of working teeth in the drive gearing in the angle gear boxes; and to provide a drive system which is light in weight and safe in flight.

Other objects will be evident from the specification and claims and from the drawings which illustrate one embodiment of the invention.

In the drawings, wherein similar reference characters refer to the same parts throughout the several views, Fig. 1 is a plan view of an all wing, low aspect ratio airplane embodying the propeller drive system of the invention, parts being broken away to facilitate illustration.

Fig. 2 is a horizontal sectional view through the transmission means of one engine showing the fluid coupling, the two-speed gearing, and the reversing gearing.

Fig. 3 is a side elevation, partly in section, of one of the propeller driving means showing the differential gearing and reduction gearing in the angle gear box.

Fig. 4 is a detail sectional view on line 4—4 of Fig. 2 showing the self-energizing brake and the overrunning clutch associated with the two-speed mechanism.

Fig. 5 is a sectional view on line 5—5 of Fig. 2.

As herein shown, the invention is embodied in a low aspect ratio, all wing airplane 10 having a pilot compartment 12 centrally located in the forward part of the wing and two nacelles 14 and 15 projecting forwardly from the leading edge 16 at the lateral extremities of the wing. The nacelles 14 and 15 have propeller driving means including angle gear boxes 18 and 20 which enclose reduction gearing and bevel gearing for driving two propellers 22 and 24 which are mounted for opposite rotation on usual propeller shafts projecting forwardly from the gear boxes 18 and 20. One of these propellers is shown at 24 in Fig. 3.

The propellers 22 and 24 are driven by two engines 26 and 28 which may be of any type suitable for aircraft propulsion, and are herein diagrammatically illustrated as identical engines of the radial cylinder, air-cooled type. As shown in Fig. 1 these engines are mounted in the wing on opposite sides of and somewhat to the rear of compartment 12 and have their axes of rotation inclined toward the angle gear boxes 18 and 20 respectively. The engines have transmission means 32 and 34, hereinafter more fully described, which are connected by shafting 36 and 38 with the propeller driving means in the angle gear boxes 18 and 20. The transmission means of the two engines are interconnected by a transverse driving shaft 40 which has suitable angle gears at its opposite ends in angle gear boxes 42 and 44 carried by the housing for transmission means 32 and 34, so that upon disconnection of either engine from the system both propellers will be driven from the other engine. The driving elements of transmission means 32 and 34 are identical except that means 32 includes reversing gearing not provided in means 34 in order that like rotating engines may be used, and consequently transmission means 32 has been selected for detailed illustration.

Referring to Fig. 2, 46 represents a driven shaft of engine 26 and may be the engine crankshaft or an extension thereof. A sleeve coupling 48 is splined at one end to shaft 46 and at its opposite end to the hub 50 of the driving member of a fluid coupling, the overlapping ends of shaft 46 and sleeve 48 being journalled in a bearing 54 carried by a web 56 secured between the engine crankcase 58 and a generally cylindrical transmission housing 60 forming an extension thereof. The engine torque is transmitted from shaft 46 and sleeve 48 to a short coaxial shaft 63 through a parallel arrangement of fluid coupling and epicyclic gearing. In addition to the driving member 62, the fluid coupling includes a driven member 64 which has a hub 66 rotatably mounted on shaft 63 by a plurality of rollers 68. The driving member 62 of the coupling has a cylindrical housing member 70 which carries a ring gear 72 of the epicyclic gearing, the sun gear 74 of which is formed in the hub 66 of the driven coupling member 64. The planetary gears 76 which mesh with sun gear 74 and ring gear 72 are carried by a spider 78 splined at 80 to shaft 63.

Oil is continuously supplied to the coupling through a pipe 84 from the engine oil pump (not shown) and is drained from the coupling through a plurality of peripheral ports 86 in the housing 70 normally covered by a ring valve 88 which extends around the periphery of the housing and is slidable between a port closing position shown in full lines in Fig. 5 and a port open position shown in dotted lines. Due to the number of these ports and the fact that oil in the coupling is discharged through them by centrifugal force, the drain ports 86 have a much greater flow capacity than the supply pipe 84. The valve is manually actuated between its open and closed positions by suitable linkage extending to the pilot's compartment and connected to the ring valve 88 by rods 90, one of which is shown at the bottom of the coupling in Fig. 2. One end of rod 90 is connected to a pair of inner and outer plates 91 and 92 slidable on casing 60 and connected by a stud 93 reciprocable in a slot 94 in casing 80. Stud 93 comprises the inner race of a ball bearing 95, the outer race of which is received between spaced external flanges 96 on the ring valve 88. One of the flanges 96 has a forwardly extending stud 97 fixed thereto, as by welding, which is provided with spaced annular notches 98 and 99 adapted to receive spring pressed detents 100 carried by casing 70 and rotatable with ring gear 88. As shown in full and dotted lines in Fig. 5, the notches 98 and 99 correspond to the port open and port closed positions of valve 88 and in cooperation with the detents 100 hold the valve 88 in either open or closed position as selected by the pilot.

A planetary pinion carrier, or spider, 102 splined to shaft 63 has four equally spaced, radially projecting studs 104 each carrying a bevel pinion gear 106 meshing with bevel sun gears 108 and 110 rotatably mounted on shaft 63 on bearings 112 and 114 respectively. The rotation of sun gear 108 on its bearings 112 is controlled by roller clutch mechanism and brake mechanism best shown in Figs. 2 and 4. A flange 116 secured to gear 108 by cap screws 118 has a rearwardly extended flange, or drum, 120, the outer annular surface of which is acted upon by a brake band 122 including a usual lining 124. The application of the brake is initiated by a lever 126 suitably operatively connected to controls in the pilot's compartment. Moving lever 126 about its pivot 128 in a clockwise direction (Fig. 4) causes a roller 130 to ride over cam arm 132 and lightly apply the brake by means of a toggle linkage including links 134 and 136 carried by opposite ends of the brake band, of which link 134 forms an integral part of cam arm 132. The brake band is free to rotate with the flange 120 as the latter moves in a clockwise direction (Fig. 4) to further tighten the brake band as the tail of cam arm 132 moves farther and farther under roller 130. However, this brake applying movement is limited and controlled.

To this end the brake band is supported and guided at three equally spaced points about its periphery by mechanism, one unit of which is shown in Fig. 4. One end of a hydraulic cylinder 144 is pivotally supported on a bracket 145 formed integral with a housing 146 fixed to the brake band 122 and has a piston 148 therein provided with a piston rod 150 pivotally attached to an inwardly projecting bifurcated lug 152 integral with housing 60. The brake band is urged in a counterclockwise direction by a relatively heavy compression spring 154 acting between a flange 155 at the base of the cylinder and a flange 156 at the pivoted end of piston rod 150. The piston 148 is provided with valves 157 which allow this counterclockwise rotation to take place quickly by freely venting the hydraulic fluid in the cylinder but which vent the fluid through small bleed passages 157a in the valves whenever the brake band with its attached cylinder moves clockwise during application of the brake. The brake band is further supported in a radial direction at each of the supporting units by a compression spring 158 in housing 146 which acts between the free end of the housing and a transverse bar 160 which is fixed to the parallel sides of an annular U-shaped guiding and supporting member 162. Member 162, which is shown in section in Fig. 2, is rotatably supported on the inner surface of casing 60 and moves with the brake band as the latter grips the flange 120 and moves clockwise (Fig. 4) to apply the brake, or moves counterclockwise under action of springs 154 upon releasing the brake by the movement of lever 126 in a counterclockwise direction.

A roller clutch is provided to prevent flange 120 from rotating in a clockwise direction (Fig. 4) faster than engine speed, while permitting free rotation thereof in the opposite direction. A forwardly directed flange 164 on spider 78 of the spur gear planetary lies within the flange 120 and comprises the inner member of the clutch. The outer surface of flange 164 is provided with suitable inclined cam surfaces 166 which cooperate with rollers 168 of the clutch to lock the flanges 164 and 120 together whenever the speed of the latter equals that of flange 164 in a clockwise direction of rotation.

The sun gear 110 of the bevel gear planetary has bevel gear teeth 170 which mesh with four bevel gears 172 mounted on studs 173 of a spider 174 fixed to the housing 60. A bevel gear 176 having an elongated hub 178, coaxial with shaft 63, is journalled on bearings 180 in the forward end of housing 60 and has gear teeth 181 which mesh with the four gears 172. Power is transmitted directly from gear 176 to the propeller drive means in the forward angle gear box 14 through a universal connection 182 and shaft 36 and is also transmitted to the shaft 40 interconnecting the engine transmission means 32 and 34 by bevel gear 184 in angle gear box 42 meshing with gear teeth 176 on gear 178 and a universal connection 188 between gear 184 and shaft 40.

The propeller driving means for propeller 24 is shown in Fig. 3, parts of the angle gear box 20 enclosing the driving means also being shown. The drive shaft 38 from the engine transmission means 34 of engine 28 terminates in a bevel gear 190 which meshes with bevel gears 192 and 194. The gears 192, 194 are supported for rotation about a transverse shaft 195 carried by a housing 193 which is rigidly supported in the angle gear box 20, suitable anti-friction bearings 197 being provided in the housing for the gears. The gears 192, 194 mesh with a bevel gear 196 which is splined to a short shaft 198 journalled in bearings 200 in a housing section 202 which is rigidly connected by webs 204 with the housing 193 and in bearings 215 carried in shaft 25. The shaft 198 has a sun pinion 206 of a planetary gearing formed integral therewith which meshes with a plurality of planetary pinions 208 mounted on a planetary spider 210 which is splined to the propeller shaft 25 at 212. Shaft 25 is journalled in bearings 214 carried by a housing section 216 which is bolted by through bolts 218 to housing section 202, a ring gear 220 being secured between the bolted peripheries of said housings. Housing 216 also carries a radially extended flange 222 the periphery of which is connected by bolts 224 to inwardly directed flanges 226 of the gear box 20.

It will be understood that oil is continuously circulated through both the housings 60 of transmission means 32 and 34 and the angle gear boxes 18 and 20 in a normal manner.

In the normal operation of the propeller drive system, when both engines are transmitting their normal torque to the system, the ports 86 around the periphery of the fluid couplings are closed by the ring valves 88 and the couplings are consequently full of oil. Under these conditions the driving and driven coupling members 62 and 64 rotate substantially in unison. Member 64 rotates more slowly by one percent to three percent since there must be some slippage in the fluid coupling in order for it to transmit torque; and sun gear 74, ring gear 72 and planetary pinions 76 rotate as a unit to drive the spider 78 at engine speed and in the same direction as the engine driven shaft 46.

The spider 102 of the bevel planetary gearing being keyed to the shaft 63 causes the planetary gears 106 to be rotated bodily at engine speed about shaft 63. The speed at which these gears 106 are driven about their own axes depends upon the speed of rotation of the sun gear 108 which may be fixed by the application of the brake band 122 to the drum 120 or may rotate at engine speed in the same direction as shaft 63 if this brake band is released. Here it will be noted that the forwardly directed flange 164 on spider 78 is rotating with shaft 63 and that, while gear 108 would normally be driven in the same direction at a speed faster than engine speed, it is restrained by rollers 168 of the clutch acting against inclined surfaces 166 from exceeding the engine speed of flange 164. Thus with the brake released the sun gear 110, with the gear ratio shown, is driven at engine speed by planetary gears 106; while with the brake applied and gear 108 stationary, sun gear 110 will be driven at twice engine speed.

It will be evident that with the shaft 46 driven in the direction of the arrow in Fig. 2, the propeller 22 will be driven in the opposite direction of rotation due to the reversal of drive in the bevel gears 172 provided in the transmission means 32. In the transmission means 34, however, which does not include this reversing mechanism, the rotation of the engine 28, which is identical with engine 26, will cause propeller 24 to rotate in the same direction as the engine rotation. Likewise the gears 176 of the two transmission means 32 and 34 are rotating in opposite directions so that they can be directly connected by the bevel gears 184 at the opposite ends of the interconnecting shaft 40. The system thus provides for the opposite rotation of propellers 22, 24 by like rotating engines with a minimum of gearing and shafting.

It will be understood that when the airplane is taking off and hence is running at low speed it is desirable to drive the propeller at a high R. P. M., referred to herein as the low airplane speed gear ratio i. e., with the brake engaged. When the plane has reached its normal cruising speed it is then desirable that the propeller should be driven at a lower R. P. M. relative to engine R. P. M., herein referred to as the high airplane speed gear ratio i. e., with the brake released.

To effect locking of gear 108 by the brake it is only necessary for the pilot to move his controls to cause levers 126, associated with the two transmission means 32 and 34, to be moved from the full to the dotted line position in Fig. 4. This movement causes an initial application of the brake band to flange 120 which causes the brake band 122, guiding member 162 and hydraulic cylinders 144 to move in a clockwise direction, indicated by the arrow in Fig. 4, to further apply the brake as cam arm 132 slowly moves to the right under roller 130. This slow application of the brake results from the slow escape of fluid through the bleed holes 157a in valves 157 in the pistons 148.

The brake can be manually released to change the driving gear ratio by a reverse movement of lever 126 into the full line position shown in Fig. 4. The movement of the brake in its releasing movement under the action of springs 154 is rapid, the unseating of valves 157 permitting the fluid to pass freely through the piston as the cylinders 144 move counterclockwise relative to the pistons.

Either engine can be disconnected from the drive system at the will of the pilot by operating the controls including rods 90 to move ring valve 88 to the left as viewed in Fig. 2 to uncover ports 86. Due to centrifugal force acting on the oil, the coupling will drain through the ports 86 more rapidly than oil can be supplied through pipe 84 and the driven clutch member 64 will no longer be driven by clutch member 62. As the ring valves 88 of the transmission means 32, 34 are separately operable, either engine or both engines can be disconnected from the drive system. Assuming that the engine 26 of the transmission means 32 is disconnected at its fluid coupling and the other engine 28 continues to drive the system, it will be evident that the gear 108 and the drum 120 will slow up, stop, and finally rotate in a reverse direction. The roller clutch under these conditions will permit flange 120 to rotate freely in this reverse direction while the drive from engine 28 will continue to drive both propellers.

Likewise, assuming that both engines are connected to the system at their fluid couplings and are driving the interconnected propellers, then, as previously described, gears 108 and the connected drums 120 will be rotating in the direction of engine rotation, i. e. clockwise as viewed in Fig. 4, at a speed not exceeding the speed of rotation of the engine shafts. If engine 26, for example, should fail under the above conditions, gear 108 and attached drum 120 of its transmission would no longer be driven in the direction of engine rotation by shaft 63 but instead would be driven in the reverse direction (counter-clockwise Fig. 4) by pinions 106 as the latter are rotated about their own axes by the drive from engine 28. This reverse rotation is permitted by the roller clutch just as in the case of the manual diconnection at the fluid coupling previously discussed. It will be noted that with the above described transmission system whatever torque the engine 26 may develop, even though it may be developing only partial torque, will be utilized in driving the interconnected propeller system.

Should engine 26 fail when the brake is on, the reverse rotation of drum 120 will cause the brake to be released automatically into the dotted position of lever 126 and roller 130, shown in Fig. 4, enabling the other engine 28 to drive both propellers independently of the defective engine.

As a result of these improvements it will be evident that a drive system has been provided for driving two oppositely rotating propellers from two like rotating engines, in which either engine or both can be disconnected from the system by the pilot and in which either engine is immediately disconnected from the driving system automatically upon its failure to produce sufficient torque to supply power to the system. Further, there has been provided in such a system improved two-speed gearing between each engine and the system in which change of gears can be made from one to the other gear ratio without throttling the engines or disconnecting them from the system. Also as a result of the fluid couplings included in the engine drives, it will be evident that torsional oscillations in the engines will not be transmitted to the interconnected propeller system.

It will be further evident that a drive system of the above type has been provided which is especially adapted for a low aspect ratio, all wing airplane wherein propellers located at the forward lateral extremity of such an airplane are driven by engines located in the wing by drive mechanism extending on opposite sides of the centrally located pilot compartment.

It will further be evident that, as a result of the improved drive system in which the engine drives are directed obliquely from the engines located on opposite sides of the pilot compartment toward the propellers, an improved and simplified driving system has been provided requiring a minimum of gearing and shafting.

While only one embodiment of the invention has been shown and described herein, for purposes of illustration, it is to be understood that various changes in the construction and arrangement of the parts may be made without departing from the scope of the following claims:

I claim:

1. In an aircraft, a streamlined body having two laterally spaced propellers including propeller shafts mounted for opposite rotation at the leading edge thereof, a pilot compartment within said body between said propellers, two like rotating engines mounted within said body having driving shafts on opposite sides of said compartment, power transmission means connecting the shafts of said engines respectively with the shafts of said propellers including two-speed mechanism, means for interconnecting said transmission means including a transverse shaft capable of transmitting the power from either engine to the transmission means associated with the other engine, means for reversing the drive of one of said engines in one of said engine transmission means, and means operative upon reversal of torque in the driving shaft of either engine for disconnecting that engine from its transmission means.

2. In an all-wing low aspect ratio aircraft, an airfoil having two widely spaced propellers mounted for rotation at the forward edge thereof and including parallel propeller shafts having reduction gearing at their inboard ends, a pilot compartment in said airfoil between said propellers, two engines mounted in said airfoil between said propellers and disposed toward the rear of said compartment having axial drive shafts located between and disposed at oblique angles relative to said propeller shafts, transmission means directly connecting said drive shafts respectively with the reduction gearing of said propellers including shafting aligned with said engine drive shafts, and means interconnecting said transmission means including a transverse shaft capable of transmitting the power from either engine to the transmission means associated with the other engine.

3. An all-wing low aspect ratio airplane having laterally spaced propeller nacelles projecting forwardly from the leading edge thereof at opposite lateral extremities, oppositely rotating propellers mounted on said nacelles having their remote blades moving downwardly propeller driving means in each nacelle including a propeller shaft and a reduction gearing, a pilot compartment in said wing between said nacelles, two like rotating engines mounted within said wing between said nacelles having driving shafts, transmission means connecting said engines respectively with the reduction gearing in said nacelles one of said transmission means having means for reversing the drive of its associated engine, means interconnecting said transmission means including a transverse shaft capable of transmitting the power from either engine to the transmission means associated with the other engine, and means operative upon reversal of torque in the driving shaft of either engine for disconnecting that engine from its transmission means.

4. An all-wing low aspect ratio airplane having laterally spaced nacelles projecting forwardly from the leading edge adjacent the lateral extremities thereof, propeller driving means in each nacelle including a fore and aft extended propeller shaft and a reduction gearing, a pilot compartment in said wing between said nacelles, two engines mounted adjacent each other in said wing on opposite sides of the fore and aft centerline of said wing between the axes of said propeller shafts with their axes of rotation directed forward and outwardly toward the respective reduction gearing of said propellers, transmission means directly connecting said engines with said gearing extending obliquely with respect to said propeller shafts on opposite sides of said compartment, and means interconnecting said transmission means including a shaft capable of transmitting the power from either engine to the transmission means associated with the other engine.

5. In a multiple engined aircraft, a plurality of engine-propeller sets, each set including a propeller having a shaft, an engine having a shaft and drive means connecting said engine and propeller shafts, means for interconnecting the drive means of the sets, whereby all the propellers can be driven by the engine of any set, the drive means of each set having two-speed mechanism including clutch means operated upon reversal of torque in the engine shaft for automatically disconnecting the engine from the system, and means between the engine and said two-speed mechanism for absorbing torsional oscillations originating in the engine shaft.

6. In a two engined aircraft, two engine-propeller sets, each including a propeller having a shaft, an engine having a shaft and drive means connecting said shafts, means interconnecting the drive means of the sets, whereby both propellers can be driven from either engine, each drive means having a fluid coupling including driving and driven members, planetary gearing having a sun gear connected to one of said members, a ring gear connected to the other of said members and a planet pinion carrying member having pinions meshing with said sun and ring gears, means for supplying fluid to said coupling, and means for draining the fluid from said coupling.

7. In a two engined aircraft, two engine-propeller sets, each including a propeller having a shaft, an engine having a shaft and drive means connecting said shafts, each drive means having an engine driven shaft and a fluid coupling connecting the latter shaft with the engine shaft including driving and driven coupling members, planetary gearing having a sun gear connected to one of said members, a ring gear connected to the other of said members and a planet pinion carrying member fixed to said engine driven shaft having pinions meshing with said sun and ring gears, means for constantly supplying fluid to said coupling, and means having a greater flow capacity than said fluid supplying means for draining the fluid from said coupling for disconnecting the drive between said engine shaft and said engine driven shaft.

8. In a two engined aircraft, a drive system comprising two engine-propeller sets, each including a propeller having a shaft, an engine having a shaft and drive means connecting said shafts, and means for interconnecting the drive means of the sets, each of said drive means having means for automatically disconnecting each engine from the drive system upon failure of that engine, whereby both propellers are driven from the other engine, said last mentioned means including an intermediate shaft, a spider carrying planetary pinions rotatable with said intermediate shaft, two sun gears rotatably mounted on said shaft and meshing with said planetary pinions, one of said sun gears being operatively connected with the drive system, and means including a roller clutch having one clutch element thereof connected to said shaft and the other clutch element thereof connected to said other sun gear for permitting said other sun gear to rotate freely in a direction reverse to the direction of rotation of said shaft while limiting the speed of rotation in the other direction to the speed of rotation of said shaft.

9. In a two engined aircraft, two engine-propeller sets, each including a propeller having a shaft, an engine having a shaft and drive means connecting said shafts, means interconnecting the drive means of the sets, whereby both propellers can be driven from either engine, the drive means of each set including a shaft driven from the engine shaft, means forming a disconnectible connection between said last mentioned shafts including a fluid coupling and a planetary gearing connected in parallel, said coupling having a driving member connected with said engine shaft and a freely rotatable driven member, and said planetary having a ring gear carried by said driving member and a sun gear carried by said driven member, and a spider fixed to said engine driven shaft having planet gears meshing with said sun and ring gears.

10. In a two engined aircraft, two engine-propeller sets, each including a propeller driving shaft, an engine driven shaft and drive means connecting said shafts, means for interconnecting said drive means of the sets, each of said drive means including an overrunning clutch having one member driven by the engine driven shaft, another clutch member rotatable thereon, a two-speed mechanism including a sun gear carried by said other clutch member, and a planet gear carrying member fixed to said engine driven shaft having planet pinions meshing with said sun gear, and a second sun gear meshing with said planet gears and connected with said drive means, and releasable means for holding said other clutch member.

11. In a two engined aircraft, two engine-propeller sets, each including a propeller having a shaft, an engine having a shaft and drive means connecting said shafts, means interconnecting the drive means of the sets, whereby both propellers can be driven from either engine, each drive means including an engine driven shaft, means for connecting said engine shaft and engine driven shaft comprising a fluid coupling including driving and driven members, planetary gearing having a sun gear connected to one of said members, a ring gear connected to the other of said members and a planet pinion carrying member fixed to said engine driven shaft having pinions meshing with said sun and ring gears, means for supplying fluid to said coupling, means for draining the fluid from said coupling, means for automatically disconnecting said engine from its drive means upon reversal of torque including an overrunning clutch having one member fixed to said engine driven shaft and another member connected to said interconnected drive means.

12. In a multiple motored aircraft, a plurality of engine-propeller sets, said sets including a propeller having a shaft and an engine having a shaft and drive means connecting said shafts including an engine driven shaft, means including a transverse shaft for operatively connecting said drive means of said sets, and means on the engine side of said transverse shaft operative upon reversal of torque of either motor for permitting the other motor to drive the propellers of both sets independent of the defective motor, said last mentioned means comprising two-speed mechanism including an overrunning clutch having one clutch member fixed to said engine driven shaft, a second clutch member rotatable on said shaft, a planet pinion carrying member fixed to said engine driven shaft having planet pinions thereon, two sun gears rotatable on said shaft, one operatively connected to said drive means and the other fixed to said other clutch member, and brake means for holding said other clutch member.

13. In a multiple motored aircraft, a plurality of engine-propeller sets, each of said sets including a propeller having a shaft, an engine having a shaft and drive means connecting said shafts including an engine driven shaft, means including a transverse shaft for operatively connecting said drive means of said sets, and means on the engine side of said transverse shaft operative upon reversal of torque of either motor for permitting the other motor to drive the propellers of both sets independent of the defective motor, said last mentioned means comprising two-speed mechanism including an overrunning clutch having one clutch member fixed to said engine driven shaft, a second clutch member rotatable on said shaft, a planet pinion carrying member fixed to said engine driven shaft having planet pinions thereon, two sun gears rotatable on said shaft, one operatively connected to said drive means and the other fixed to said other clutch member, brake means for holding said other clutch member, and means for releasing said brake upon failure of the connected engine.

14. In an aircraft, a plurality of engines, a plurality of propellers, means for interconnecting said propellers whereby all the propellers may be driven by any engine, and transmission means for connecting each engine to the interconnected propeller system and for automatically disconnecting the engine upon failure including a planetary gearing comprising a pinion carrier driven by the engine having a plurality of planetary pinions thereon meshing with two gears of the planetary gearing, one of said gears being drivingly connected to the propeller system and the other being rotatably mounted, means for effecting rotation of both of said gears with said carrier at engine speed, and means for holding said rotatable gear to effect rotation of said planetary pinions about their respective axes.

15. In an aircraft, a plurality of engines, a plurality of propellers, means for interconnecting said propellers whereby all the propellers may be driven by any engine, and transmission means for connecting each engine to the interconnected propeller system and for automatically disconnecting the engine upon failure including a planetary gearing comprising a pinion carrier driven by the engine having a plurality of planetary pinions thereon meshing with two gears of the planetary gearing, one of said gears being drivingly connected to the propeller system and the other being rotatably mounted, means for effecting rotation of both of said gears with said carrier to drive said propeller system at one speed ratio, means for holding said rotatable gear to cause rotation of said planetary pinions about their respective axes and drive said propeller system at another speed ratio, and means automatically operative upon failure of the engine for releasing said holding means.

16. In an aircraft, a plurality of engines, a plurality of propellers, means for interconnecting said propellers whereby all the propellers may be driven by any engine, and transmission means for connecting each engine to the interconnected propeller system including a two-speed mechanism having means for automatically disconnecting the engine upon failure including a planetary gearing comprising a pinion carrier driven by the engine having a plurality of planetary pinions thereon meshing with two gears of the planetary gearing, one of said gears being drivingly connected to the propeller system and the other being rotatably mounted adjacent an engine driven member, means for effecting bodily rotation of both of said gears and said carrier with said member to provide one speed ratio including means for restraining said rotatable gear from rotating faster than said member, and releasable means for holding said rotatable gear to effect rotation of said planetary pinions about their respective axes to provide the second speed ratio.

17. In an aircraft, a plurality of engines, a plurality of propellers, means for interconnecting said propellers whereby all the propellers may be driven by any engine, and transmission means for connecting each engine to the interconnected propeller system including a fluid coupling and a two-speed mechanism having means for automatically disconnecting the engine upon failure including a planetary gearing comprising a pinion carrier driven by the engine having a plurality of planetary pinions thereon meshing with two gears of the planetary gearing, one of said gears being drivingly connected to the propeller system and the other being rotatably mounted adjacent an engine driven member, means for effecting bodily rotation of both of said gears and said carrier with said member to provide one speed ratio including means on said engine driven member for restraining said rotatable gear from rotating in the same direction faster than said member, releasable means for holding said rotatable gear to effect rotation of said planetary pinions about their respective axes to provide the second speed ratio, and means controlled by the pilot for disconnecting the engine at said fluid coupling.

18. In an aircraft, a plurality of engines, a plurality of propellers, means for interconnecting said propellers whereby all the propellers may be driven by any engine, and transmission means for connecting each engine to the interconnected propeller system and for automatically disconnecting the engine upon failure including a planetary gearing comprising a pinion carrier driven by the engine having a plurality of planetary pinions thereon meshing with two gears in the planetary gearing, one of said gears being drivingly connected to the propeller system and the other being rotatably mounted adjacent an engine driven member, means for effecting bodily rotation of both of said gears and said carrier at the speed of said member including an overrunning clutch connection between said member and said rotatable gear for restraining said rotatable gear from rotating faster than said member in the same direction of rotation while permitting free rotation relative thereto in the opposite direction, and releasable means for holding said rotatable gear to effect rotation of said planetary pinions about their respective axes to drive said propeller system at a speed other than the speed of said member.

19. In an aircraft, a plurality of engines, a plurality of propellers, means for interconnecting said propellers whereby all the propellers may be driven by any engine, and transmission means for connecting each engine to the interconnected propeller system and for automatically disconnecting the engine upon failure including a shaft driven by the engine carrying a planetary pinion carrier and a plurality of planetary pinions thereon meshing with two gears of a planetary gearing, one of said gears being drivingly connected to the propeller system and the other being rotatably mounted on said shaft, a clutch member rotatable with said rotatable gear, a second clutch member rotatable with said shaft, cooperating clutch elements between said members permitting rotation of said rotatable gear freely in one direction while restraining its rotation in the direction of rotation of said shaft to the speed of said shaft, and releasable means for holding said rotatable gear against rotation.

CHARLES H. ZIMMERMAN.

REFERENCES CITED

The following references are of record in the file of this patent:

UNITED STATES PATENTS

| Number | Name | Date |
|---|---|---|
| 1,089,029 | Zimmerman | Mar. 3, 1914 |
| 1,421,803 | Martin | July 4, 1922 |
| 1,431,244 | Mandel | Oct. 10, 1922 |
| 2,059,122 | Lansing | Oct. 27, 1936 |
| 2,120,821 | Waseige | June 14, 1938 |

FOREIGN PATENTS

| Number | Country | Date |
|---|---|---|
| 538,047 | Great Britain | July 17, 1941 |
| 452,922 | Great Britain | Sept. 1, 1936 |